United States Patent
Naik et al.

(10) Patent No.: US 12,369,023 B2
(45) Date of Patent: Jul. 22, 2025

(54) MACHINE LEARNING FRAMEWORK FOR WIRELESS LOCAL AREA NETWORKS (WLANS)

(71) Applicant: QUALCOMM Incorporated, San Diego, CA (US)

(72) Inventors: Gaurang Naik, San Diego, CA (US); Sai Yiu Duncan Ho, San Diego, CA (US); Yanjun Sun, San Diego, CA (US); George Cherian, San Diego, CA (US); Abhishek Pramod Patil, San Diego, CA (US); Alfred Asterjadhi, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/888,435

(22) Filed: Aug. 15, 2022

(65) Prior Publication Data
US 2024/0056795 A1   Feb. 15, 2024

(51) Int. Cl.
*H04W 8/24* (2009.01)
*H04L 41/16* (2022.01)
(Continued)

(52) U.S. Cl.
CPC ............ *H04W 8/24* (2013.01); *H04L 41/16* (2013.01); *H04W 24/02* (2013.01); *H04W 84/12* (2013.01)

(58) Field of Classification Search
CPC ..... H04W 84/12; H04W 84/18; H04W 80/04; H04W 8/26; H04W 88/06; H04W 8/24; H04W 24/02; H04L 41/16
(Continued)

(56) References Cited

U.S. PATENT DOCUMENTS 7,894,413 B1 * 2/2011 Cimini, Jr. ............ H04L 1/0007
370/473
8,891,475 B2 * 11/2014 Lee ....................... H04W 24/00
370/341

(Continued)

FOREIGN PATENT DOCUMENTS

EP        4 087 343 A1 * 11/2022 ............ H04W 72/04
WO    WO 2021/086308 A1 *  5/2021 .............. H04W 8/22
(Continued)

OTHER PUBLICATIONS

3GPP TSG-RAN WG1 Meeting #109-e, e-Meeting, May 9-May 20, 2022, R1-2204239, Agenda Item: 9.2.2.2, Source: Apple Inc., Title: Discussion on other aspects of AI/ML for CSI enhancement. (Year: 2022).*

(Continued)

*Primary Examiner* — Peter G Solinsky
*Assistant Examiner* — Sanjay K Dewan
(74) *Attorney, Agent, or Firm* — Qualcomm Incorporated/Seyfarth Shaw LLP

(57) ABSTRACT

An apparatus has a memory and one or more processors coupled to the memory. The processor(s) is configured to transmit a first message indicating a first machine learning capability of the first wireless device. The processor(s) is also configured to receive, from a second wireless device, a second message indicating a second machine learning capability of the second wireless device. The processor(s) is further configured to communicate information associated with a machine learning model for use between the first wireless device and the second wireless device based at least in part on the second machine learning capability and the first machine learning capability. The processor(s) is also configured to communicate with the second wireless device based at least in part on the machine learning model.

28 Claims, 14 Drawing Sheets

| Function ID[$] | Descriptor/Feature ID/Use Case ID [#] | ML model | | Output[#] | Input features[#] | Level of Support[#] |
|---|---|---|---|---|---|---|
| | | Type[#] | Structure[*] | | | |
| 0 | EDCA optimization (e.g., 0001) | Decision Tree (e.g., 01001) | Max_depth = 7 | Dimension = 4; values for CW_max and CW_min for AC_VI and AC_VO | 15 (along with encoding of features) | Downloadable, no re-training |
| 2 | Traffic classification (e.g., 1001) | Random Forest (e.g., 01000) | Max_depth = 7; Number of trees = 20; | Dimension = 6; prob. values for 6 DSCPs; | 5 (along with encoding of features) | Downloadable, can re-train |
| 3 | Traffic classification (e.g., 1001) | DNN (e.g., 10000) | # of hidden layers = 3; # of neurons/layer = 50 | Dimension = 10; prob. values for 10 DSCPs; | 8 (along with encoding of features) | Downloadable, can re-train, model sharing supported |

(51) Int. Cl.
*H04W 24/02* (2009.01)
*H04W 84/12* (2009.01)

(58) Field of Classification Search
USPC .......................................................... 370/338
See application file for complete search history.

(56) References Cited

U.S. PATENT DOCUMENTS

| | | | | |
|---|---|---|---|---|
| 11,770,764 | B2* | 9/2023 | Kincaid | H04W 52/38 370/338 |
| 2019/0149343 | A1* | 5/2019 | Murali | H04L 12/12 370/338 |
| 2021/0185515 | A1* | 6/2021 | Bao | H04W 72/51 |
| 2022/0342713 | A1* | 10/2022 | Shen | G06F 9/5027 |
| 2023/0209325 | A1* | 6/2023 | Lee | G06N 3/09 370/338 |

FOREIGN PATENT DOCUMENTS

| | | | | |
|---|---|---|---|---|
| WO | 2021142609 A1 | 7/2021 | | |
| WO | WO 2023/044284 A1 * | 3/2023 | ............... | G06N 3/04 |

OTHER PUBLICATIONS

Apple Inc: "Discussion on Other Aspects of AI/ML for CSI Enhancement", 3GPP TSG-RAN WG1 Meeting #109-e, R1-2204239, 3rd Generation Partnership Project, e-Meeting, May 9, 2022-May 20, 2022, 6 Pages.
International Search Report and Written Opinion—PCT/US2023/028072—ISA/EPO—Nov. 16, 2023.

* cited by examiner

| Function ID$ | Descriptor/Feature ID/Use Case ID # | ML model | | Output# | Input features# | Level of Support# |
|---|---|---|---|---|---|---|
| | | Type# | Structure* | | | |
| 0 | EDCA optimization (e.g., 0001) | Decision Tree (e.g., 01001) | Max_depth = 7 | Dimension = 4: values for CW_max and CW_min for AC_VI and AC_VO | 15 (along with encoding of features) | Downloadable, no re-training |
| 2 | Traffic classification (e.g., 1001) | Random Forest (e.g., 01000) | Max_depth = 7; Number of trees = 20; | Dimension = 6; prob. values for 6 DSCPs; | 5 (along with encoding of features) | Downloadable, can re-train |
| 3 | Traffic classification (e.g., 1001) | DNN (e.g., 10000) | # of hidden layers = 3; # of neurons/layer = 50 | Dimension = 10; prob. values for 10 DSCPs; | 8 (along with encoding of features) | Downloadable, can re-train, model sharing supported |

FIG. 9A

MACHINE LEARNING FRAMEWORK FOR WIRELESS LOCAL AREA NETWORKS (WLANS)

FIELD OF THE DISCLOSURE

The present disclosure relates generally to wireless communications, and more specifically to a machine learning framework for wireless local area networks (WLANs).

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Machine learning techniques include supervised learning, unsupervised learning, and reinforcement learning. The 802.11 specifications, however, currently have no support for the use of these machine learning techniques across devices. Proprietary models may be used by individual STAs or the AP, but these models can only be used for optimizing features that are left to implementation. It would be desirable to apply machine learning techniques to wireless communications to achieve greater efficiencies.

SUMMARY

Some aspects of the present disclosure are directed to an apparatus. The apparatus has a memory and one or more processors coupled to the memory. The processor(s) is configured to transmit a first message indicating a first machine learning capability of the first wireless device. The processor(s) is also configured to receive, from a second wireless device, a second message indicating a second machine learning capability of the second wireless device. The processor(s) is further configured to communicate information associated with a machine learning model for use between the first wireless device and the second wireless device based at least in part on the second machine learning capability and the first machine learning capability. The processor(s) is also configured to communicate with the second wireless device based at least in part on the machine learning model. In this specification, communicating refers to both transmitting and receiving.

In other aspects of the present disclosure, a method for wireless communication at a first wireless device includes transmitting a first message indicating a first machine learning capability of the first wireless device. The method also includes receiving, from a second wireless device, a second message indicating a second machine learning capability of the second wireless device. The method further includes communicating information associated with a machine learning model for use between the first wireless device and the second wireless device based at least in part on the second machine learning capability and the first machine learning capability. The method also includes communicating with the second wireless device based at least in part on the machine learning model.

Aspects generally include a method, apparatus, system, computer program product, non-transitory computer-readable medium, access point (AP), station (STA), user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 9A is a table illustrating machine learning capabilities of a wireless device, in accordance with aspects of the present disclosure.

DETAILED DESCRIPTION

Figure 1:
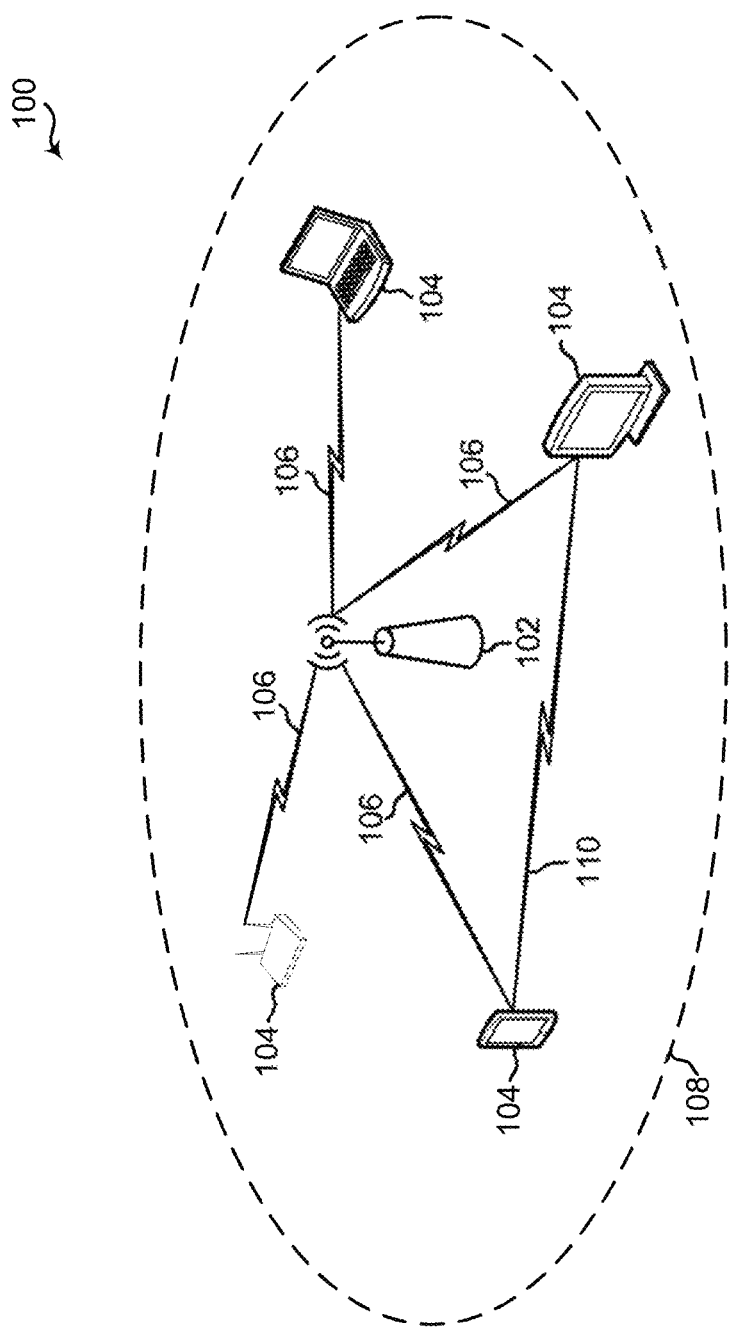
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an Internet of things (IOT) network.

As noted above, the 802.11 specifications currently have no support for the use of machine learning across devices. Proprietary models may be used by individual stations (STAs) or the AP, but these models can only be used for optimizing features that are left to implementation. One example is rate adaptation. The standard does not specify what algorithm the client can use. The client may use heuristic algorithms or machine learning based techniques. But for an application such as enhanced distributed channel access (EDCA) optimization, the 802.11 specification only allows a specified behavior. Aspects of the present disclosure create a flexible framework whereby machine learning models can be utilized for any 802.11 use case that the access point deems fit. As such, the access point may share this model across entities in the network.

Various aspects relate generally to the wireless local area networks (WLANs). Some aspects more specifically relate to a machine learning framework for WLANs. In some implementations, a wireless device, such as an access point or a station, may communicate machine learning capabilities. For example, a wireless device may advertise support of machine learning for certain use cases. Exemplary use cases include enhanced distributed channel access (EDCA) optimization, interference estimation, rate adaptation, channel state information (CSI) enhancement, and traffic classification. The fields and values of each use case may be standardized. In some aspects, the access point shares the use case with stations during discovery. Announcements by a non-access point station may be transmitted during or post-association.

The wireless device may advertise one or more machine learning (ML) models for each use case. The advertised machine learning model may indicate a type of machine learning technique and a structure of the machine learning model. Similar to with use cases, the standards may define fields and values for each type of machine learning model. An encoding associated with the structure of the machine learning model may be standardized, in some aspects. An access point may advertise the output of the machine learning model, as well as input features of the machine learning model. The fields and values may be standardized for both the output and input features.

According to aspects of the present disclosure, a wireless device may advertise a function ID, instead of the individual components. In some aspects, the function ID is a representation of a four element tuple: <Use Case, ML model, Input, Output>. The function ID field may be standardized. Of course the label 'function ID' is non-limiting, as other labels may be used instead.

For each machine learning function (which may be identified by a function ID), the wireless device may announce a level of machine learning support. For example, the access point may announce support of proprietary models by non-access point STAs. The access point may also offer downloadable trained models. The levels of support may include a downloaded model that cannot be re-trained by the non-access point. Other levels of support relate to when: a downloaded model can be re-trained by the non-access point, however, but no uploading of the updated model and aggregation is supported (e.g., no federated learning); and a downloaded model can be re-trained by the non-access point and the updated model can be uploaded to the access point (e.g., federated learning).

In some aspects, standards specifications may define a set of machine learning models for each use case. In these aspects, the model parameters may be exchanged over an air interface, such as an 802.11 air interface. In other aspects, the specifications may define encoding for individual components of a machine learning algorithm. In other words, different components of the machine learning model may be standardized. For example, the standards may define an encoding for the name/type of the machine learning model, structure of the machine learning model, and parameters of the machine learning model. The specifications may also define the model structure, including the machine learning algorithm and the model parameters. The parameters depend on the particular algorithm. Each of these components may be exchanged over an air interface, e.g., the 802.11 air interface. In other aspects of the present disclosure, external standardized interfaces define machine learning algorithm components, including the machine learning model, structure, and parameters.

According to aspects of the present disclosure, the specifications may standardize input. In other aspects, the specifications may define a set of measurements and a set of operations. In still other aspects, the specifications may define a combination of a standard set of input features and a standard set of measurements.

Particular aspects of the subject matter described in this disclosure can be implemented to realize one or more of the following potential advantages. In some examples, the described techniques, such as communicating between an access point and a non-access point station based on a machine learning model, can be used to (jointly) optimize one or more 802.11 features. These features may be difficult to optimize using conventional (e.g., non-machine learning) techniques. Moreover, downloadable models may help in creating fairness amongst the users of the machine learning models, for example, by enabling exchange of machine learning capabilities between an access point and a non-access point station and further ensuring that the same downloaded model is used by all non-access point stations.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN 100 via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan surroundings to find a more suitable AP 102 with which to associate. For example, a STA 104 that is moving relative to the associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ay, 802.1 lax, 802.11az, 802.11ba, and 802.11be). These standards define the WLAN radio and baseband protocols for the physical (PHY) and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.1 lax, and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or CCC20 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
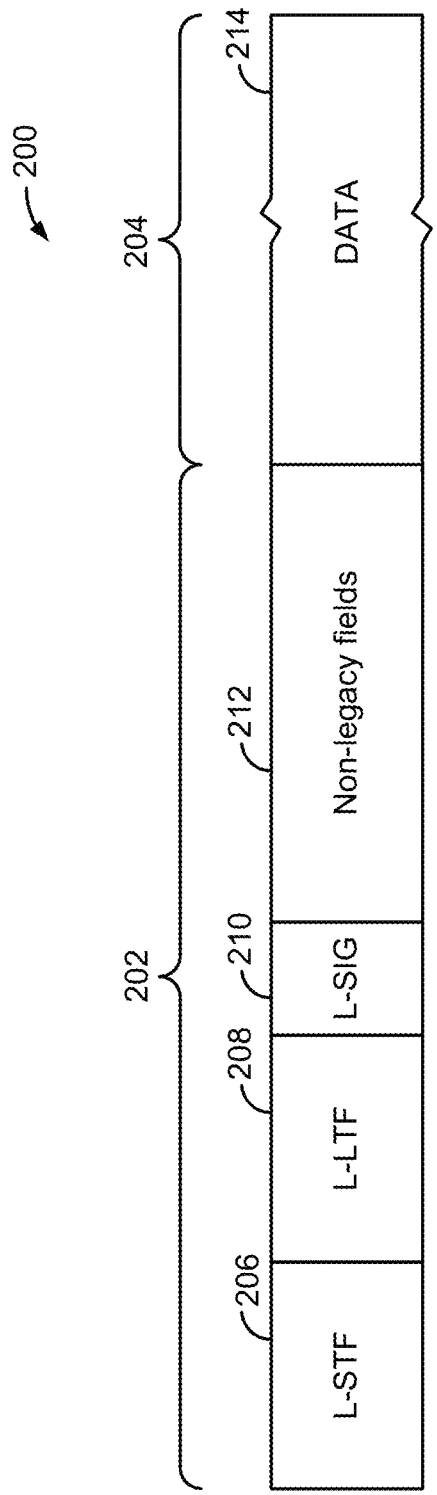
FIG. 2 shows an example protocol data unit (PDU) usable for communications between an access point (AP) and one or more stations (STAs).

FIG. 2 shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.1 lax, 802.11be, or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3:
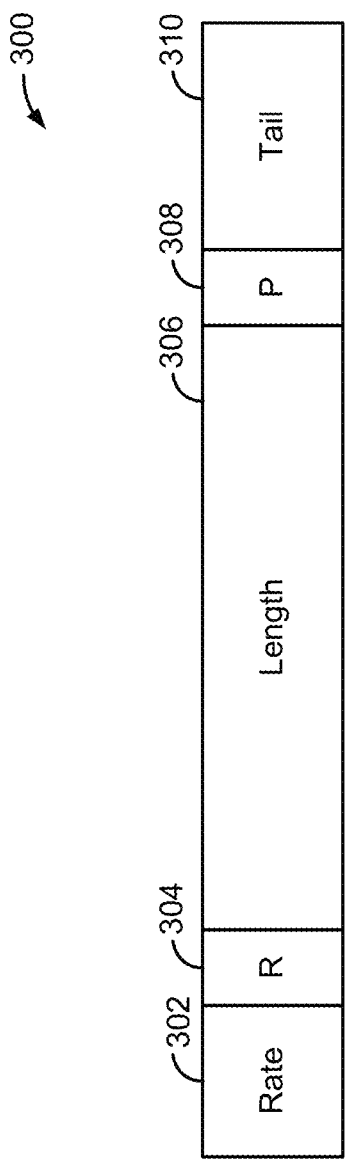
FIG. 3 shows an example field in the PDU of FIG. 2.

FIG. 3 shows an example L-SIG 300 in the PDU 200 of FIG. 2. The L-SIG 300 includes a data rate field 302, a reserved bit 304, a length field 306, a parity bit 308, and a tail field 310. The data rate field 302 indicates a data rate (note that the data rate indicated in the data rate field 302 may not be the actual data rate of the data carried in the payload 204). The length field 306 indicates a length of the packet in units of, for example, symbols or bytes. The parity bit 308 may be used to detect bit errors. The tail field 310 includes tail bits that may be used by the receiving device to terminate operation of a decoder (for example, a Viterbi decoder). The receiving device may utilize the data rate and the length indicated in the data rate field 302 and the length field 306 to determine a duration of the packet in units of, for example, microseconds (μs) or other time units.

In some aspects, the access point 102 and stations 104 may include means for transmitting, means for receiving, means for communicating, and means for advertising. Such means may include one or more components of the access point 102 and stations 104 discussed with reference to FIGS. 1, 2, 4, 10, 11A, and 11B.

Figure 4:
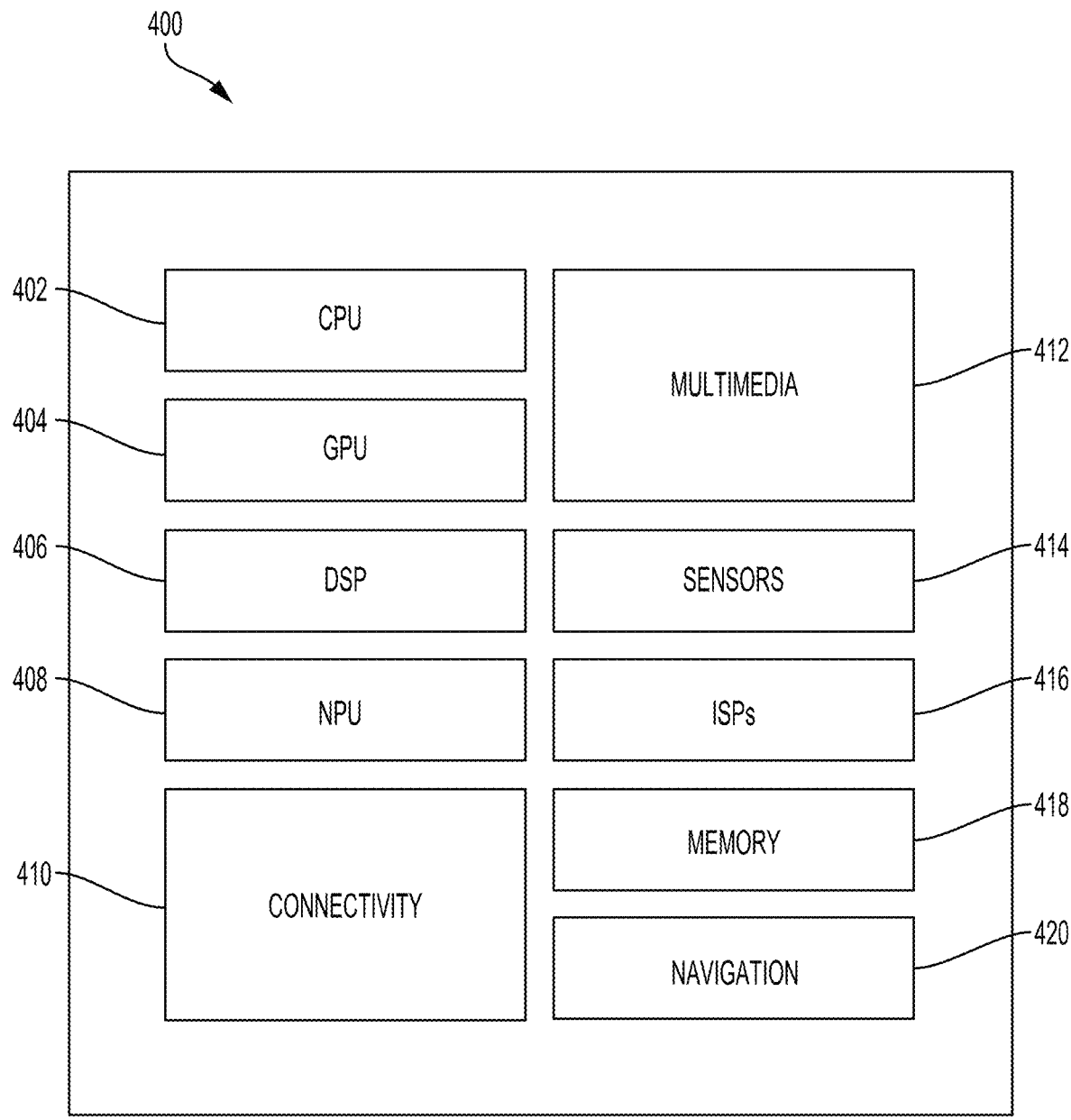
FIG. 4 illustrates an example implementation of designing a machine learning model using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the access point 102 and stations 104. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In an aspect of the present disclosure, the instructions loaded into the general-purpose processor 402 may comprise code to transmit a first message indicating a first machine learning capability of the first wireless device. The instructions loaded into the general-purpose processor 402 may also comprise code to receive, from a second wireless device, a second message indicating a second machine learning capability of the second wireless device. The instructions loaded into the general-purpose processor 402 may further comprise code to communicate information associated with a machine learning model for use between the first wireless device and the second wireless device based at least in part on the second machine learning capability and the first machine learning capability. The instructions loaded into the general-purpose processor 402 may also comprise code communicate with the second wireless device based at least in part on the machine learning model.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
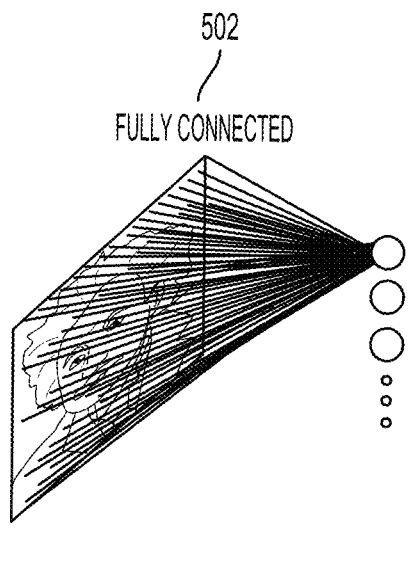
FIGS. 5A, 5B, and 5C are diagrams illustrating a neural network, in accordance with aspects of the present disclosure.
Figure 5B:
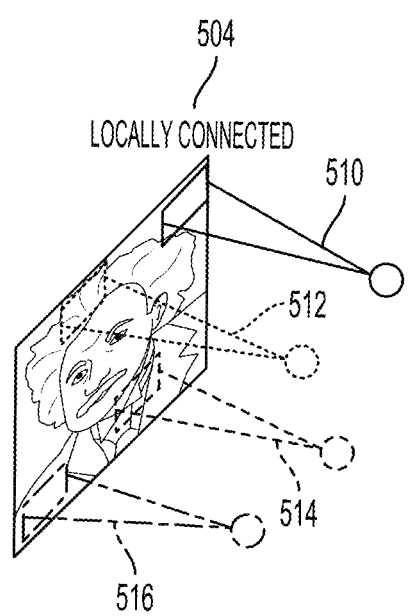

The connections between layers of a neural network may be fully connected or locally connected. FIG. 5A illustrates an example of a fully connected neural network 502. In a fully connected neural network 502, a neuron in a first layer may communicate output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer, because the higher layer neurons in a given region may receive inputs that are tuned through training to the properties of a restricted portion of the total input to the network.

Figure 5C:
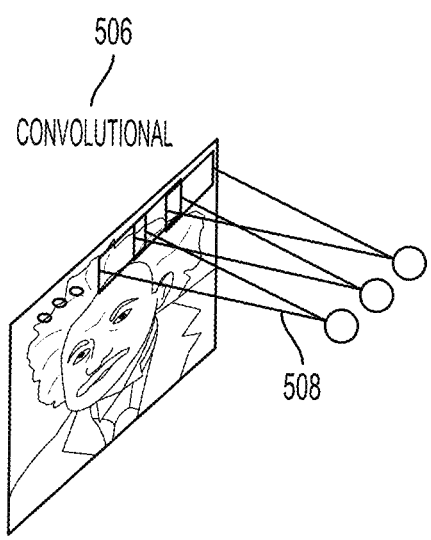

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful.

Figure 5D:
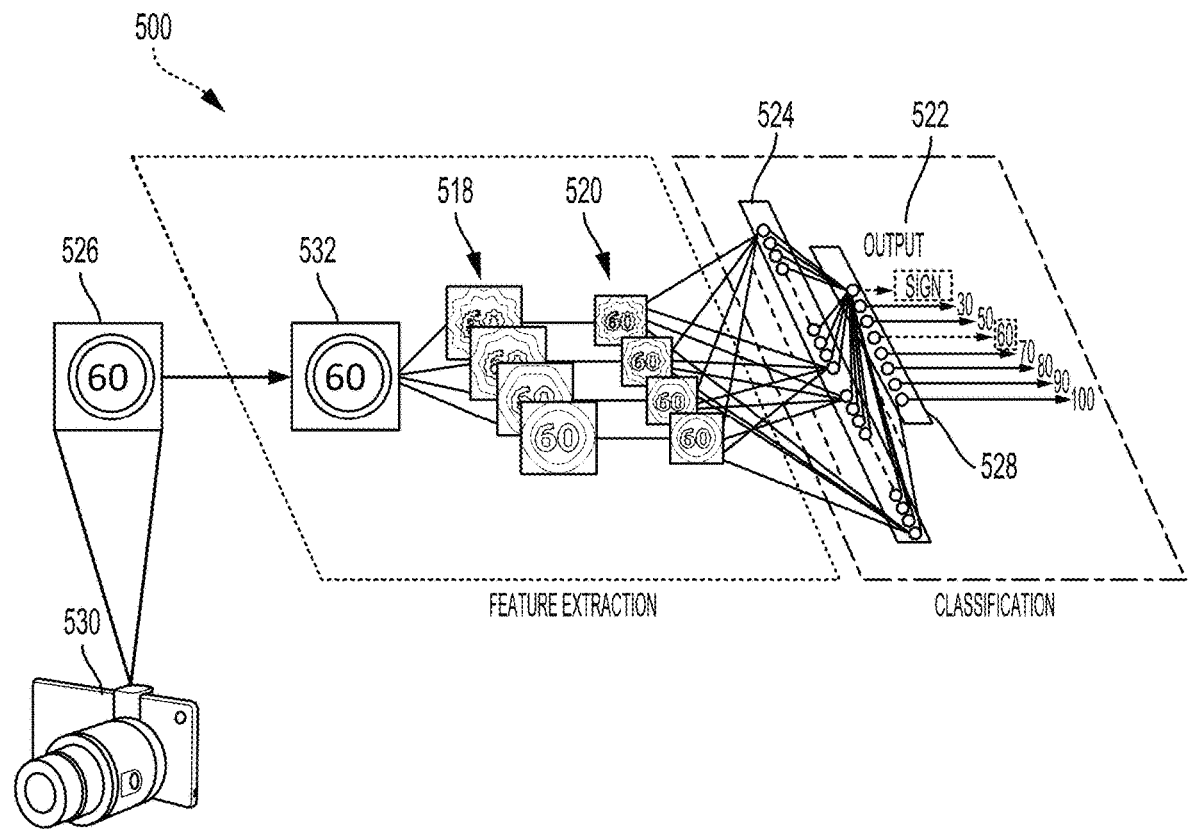
FIG. 5D is a diagram illustrating an exemplary deep convolutional network (DCN), in accordance with aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 is a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 is likely to be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as the manner involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 526) and a forward pass through the network may yield an output 522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modem deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
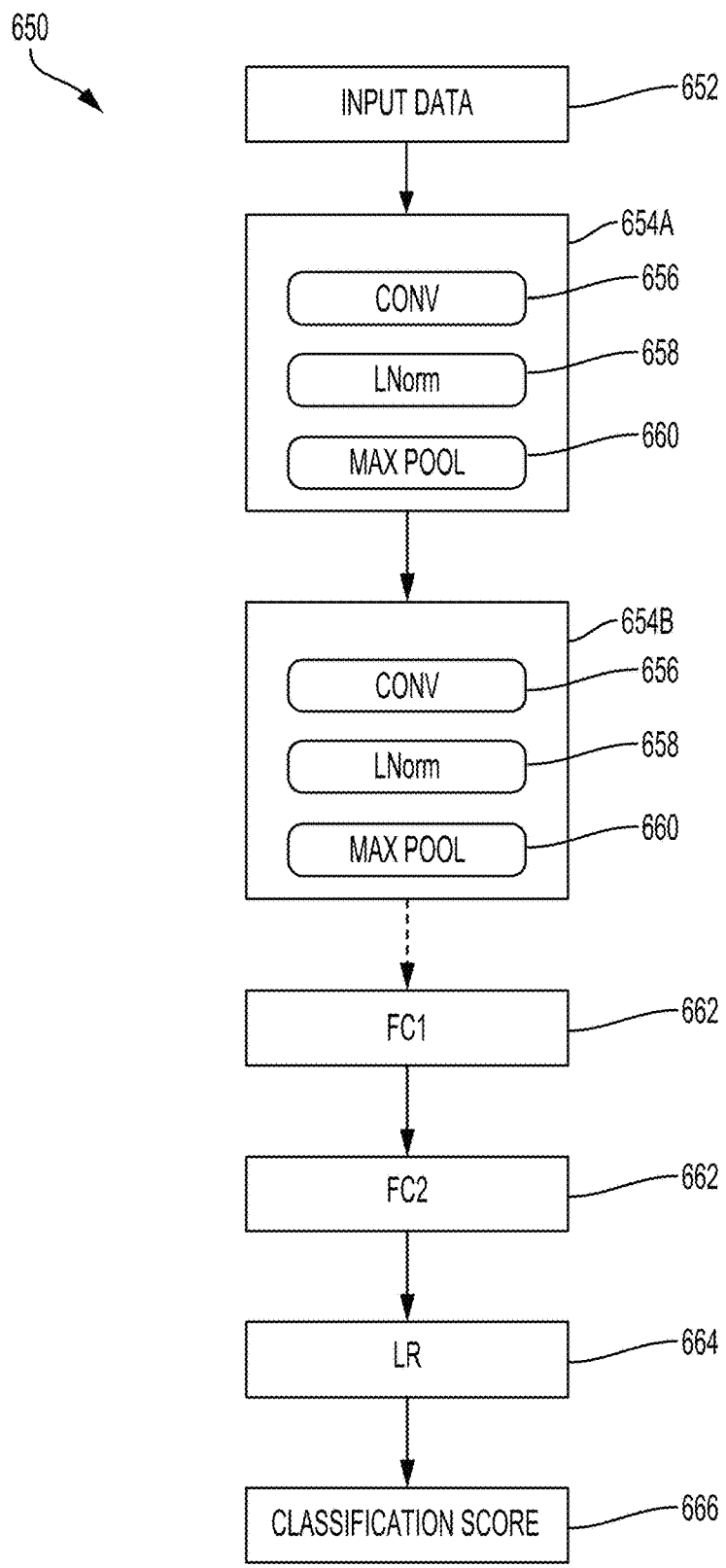
FIG. 6 is a block diagram illustrating an exemplary deep convolutional network (DCN), in accordance with aspects of the present disclosure.

FIG. 6 is a block diagram illustrating a deep convolutional network 650. The deep convolutional network 650 may include multiple different types of layers based on connectivity and weight sharing. As shown in FIG. 6, the deep convolutional network 650 includes the convolution blocks 654A, 654B. Each of the convolution blocks 654A, 654B may be configured with a convolution layer (CONV) 656, a normalization layer (LNorm) 658, and a max pooling layer (MAX POOL) 660.

The convolution layers 656 may include one or more convolutional filters, which may be applied to the input data to generate a feature map. Although only two of the convolution blocks 654A, 654B are shown, the present disclosure is not so limiting, and instead, any number of the convolution blocks 654A, 654B may be included in the deep convolutional network 650 according to design preference. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 402 or GPU 404 of an SOC 400 to achieve high performance and low power consumption. In alternative embodiments, the parallel filter banks may be loaded on the DSP 406 or an ISP 416 of an SOC 400. In addition, the deep convolutional network 650 may access other processing blocks that may be present on the SOC 400, such as sensor processor 414 and navigation module 420, dedicated, respectively, to sensors and navigation.

The deep convolutional network 650 may also include one or more fully connected layers 662 (FC1 and FC2). The deep convolutional network 650 may further include a logistic regression (LR) layer 664. Between each layer 656, 658, 660, 662, 664 of the deep convolutional network 650 are weights (not shown) that are to be updated. The output of each of the layers (e.g., 656, 658, 660, 662, 664) may serve as an input of a succeeding one of the layers (e.g., 656, 658, 660, 662, 664) in the deep convolutional network 650 to learn hierarchical feature representations from input data 652 (e.g., images, audio, video, sensor data and/or other input data) supplied at the first of the convolution blocks 654A. The output of the deep convolutional network 650 is a classification score 666 for the input data 652. The classification score 666 may be a set of probabilities, where each probability is the probability of the input data, including a feature from a set of features.

Figure 7:
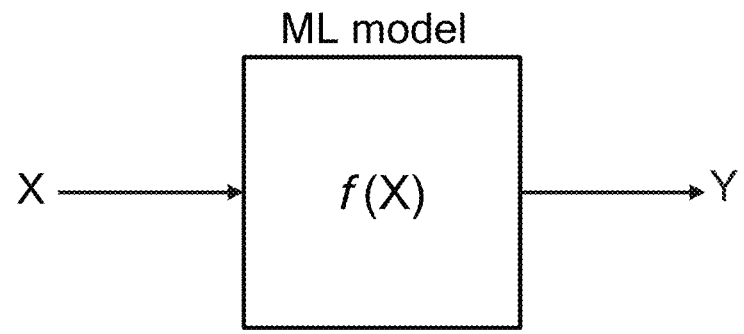
FIG. 7 is a block diagram illustrating a machine learning model at a high level, in accordance with aspects of the present disclosure.

FIG. 7 is a block diagram illustrating a machine learning model at a high level, in accordance with aspects of the present disclosure. The machine learning (ML) model of FIG. 7 is specified by: X—input; Y—output; and f—an underlying function such that Y=f(X). The input may be measurements and preprocessing steps, and the output may be characteristics of Wi-Fi features to be optimized, for example. From a dataset D={X,Y}, a machine learning model learns the mapping f: X→Y. In other words, the machine learning model operates as a function approximator. In one example, the output, Y, may be a best uplink modulation and coding scheme (MCS) index when the input, X, is a vector of observations including a received signal strength indicator (RSSI), a packet data radio (PDR), and a number of overlapping basic service sets (OBSSs).

Machine learning paradigms include supervised learning, unsupervised learning, and reinforcement learning. For supervised learning, an annotated dataset, such as a labeled image, is given. With supervised learning, data collection is an offline process. The goal of supervised learning is to learn a mapping between the annotated dataset and labels. Collecting annotated data, however, is a challenge for supervised learning. Examples of supervised learning models include neural networks, decision trees, support vector machines (SVMs), etc. For unsupervised learning, data is not annotated. Therefore, the unsupervised learning attempts to find patterns and insights. An example of an unsupervised learning technique is clustering.

Figure 8:
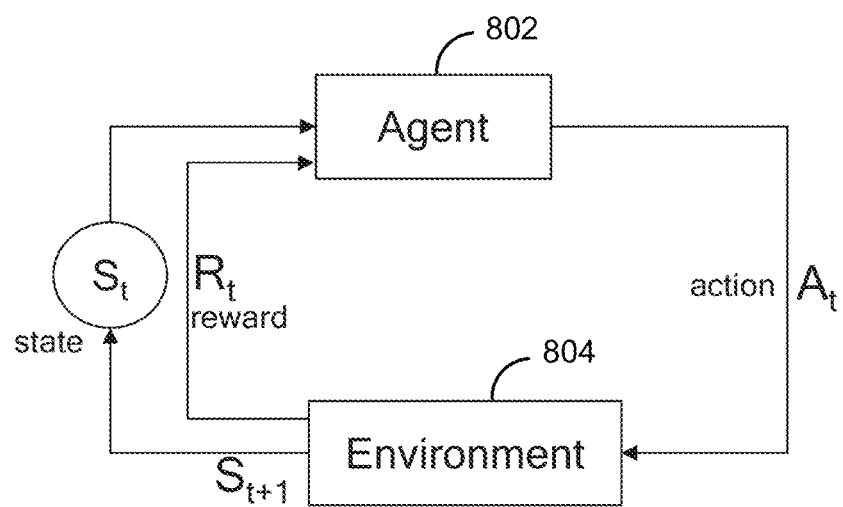
FIG. 8 is a block diagram illustrating a reinforcement learning model, in accordance with aspects of the present disclosure.

FIG. 8 is a block diagram illustrating an example of a reinforcement learning model, in accordance with aspects of the present disclosure. Reinforcement learning is another machine learning paradigm. With reinforcement learning, a system is given, and the system may include an agent 802 that interacts with an environment 804. The system also includes states $S_t$, actions $A_t$, and rewards $R_t$, where t represents a time step. The objective of reinforcement learning is to learn a policy, such as a mapping from a state $S_t$ to an action $A_t$. The agent 802 may learn through experience by taking action and observing rewards. Example reinforcement learning techniques include deep Q networks, policy gradient, etc.

Multiple levels of machine learning usage and collaboration exist. In other words, a hierarchy exists for where a machine learning model and the model's data reside. For example, a model and data may both be stored locally. In another example, the model is local, but locally stored data and data solicited from other devices in the BSS is utilized for training, such that standards may apply for the data exchange. For example, the access point (AP) may solicit measurements from associated stations (STAs). In still another level of the hierarchy, a model is local but is transported between an access point and the stations. For example, the stations may download a model structure and parameters from the access point. Model refinement may be allowed but the refined model remains local in this level of the hierarchy. For example, in this level of the hierarchy, the data is local and solicited, and standards may apply to the data exchange, model definition, and model transport. In yet another hierarchy level, the model is shared, such that stations and access points exchange a model structure and parameters. In this hierarchy level, the model is refined and shared, and data is both local and solicited. Standards may apply for the data exchange, model definition, and model transport in this hierarchy level.

Although aspects of the present disclosure are described with respect to supervised learning models, the present disclosure is not so limited. For example, reinforcement learning schemes (e.g., deep Q learning) are also contemplated, as are unsupervised models.

FIG. 9A is a table illustrating an example of machine learning capabilities of a wireless device, in accordance with aspects of the present disclosure. In these aspects of the present disclosure, a wireless device, such as an access point or a station, may communicate machine learning capabilities. A combination of use case, machine learning model, output and input may form a machine learning function. Each machine learning function offered by the access point is uniquely identified by a function ID value assigned to that function by the access point.

As an example of communicating machine learning capabilities, an access point may advertise use cases for which the access point supports machine learning. Exemplary use cases include enhanced distributed channel access (EDCA) optimization, interference estimation, rate adaptation, channel state information (CSI) enhancement, and traffic classification. In the example shown in FIG. 9A, the access point supports enhanced distributed channel access (EDCA) optimization and traffic classification (as seen in the second column of the table.) Each use case may be indicated with a binary representation. In the example of FIG. 9A, EDCA optimization is represented by 0001, and traffic classification is represented by 1001, although these values are merely exemplary. The fields and values of each use case may be standardized. In some aspects, the access point shares the use case with stations during discovery. The use case may also be referred to as a descriptor or feature ID. Advertising may refer to broadcasting or otherwise communicating a message.

The access point may advertise one or more machine learning models for each use case. The advertised machine learning model is a type of learning technique and structure. For example, a random forest technique with 20 decision trees, each tree having a max depth of seven is shown in the table of FIG. 9A for the first traffic classification use case. Another example is a deep neural network (DNN) with three hidden layers, each hidden layer having 50 neurons. The access point advertises this DNN model for the second traffic classification use case, in the example of FIG. 9A. For the EDCA optimization shown in FIG. 9A, the access point advertises a decision tree with a maximum depth of seven. Similar to as with use cases, the standards may define fields and values for each type of machine learning model. In the example of FIG. 9A, the decision tree is represented by 01001, the random forest is represented by 01000, and the DNN is represented by 10000, although these values are merely example values. The structure of the machine learning model may have encoding standardized, in some aspects.

The access point may advertise the output of the machine learning model. For example, for the EDCA optimization use case shown in FIG. 9A, the model may output a maximum contention window CW_max and a minimum contention window CW_min for video and voice access categories (AC_VI and AC_VO). For the random forest traffic classification model, in the example of FIG. 9A, the access point advertises six dimensions, and probability values for six differentiated services code points (DSCPs). For the DNN, the access point advertises an output of ten dimensions with probability values for ten DSCPs. The fields and values may be standardized for the outputs.

The access point may advertise input features of the machine learning model. For example, for the EDCA optimization use case shown in FIG. 9A, the access point advertises fifteen inputs, along with encoding of the features. Example inputs may include measured loss rate and measured throughput. In the traffic classification examples, the access point advertises five and eight input features, respectively, along with encoding of the features. Example inputs may include maximum packet size and minimum inter-arrival time. The fields and values may be standardized for input features.

The first column on FIG. 9A shows a function ID. According to aspects of the present disclosure, a function ID is a representation of a four element tuple: <Descriptor, ML model, Input, Output>. The function ID is a unique identifier for a machine learning function supported by the access point. The field may be standardized, with the value assigned by the access point. An access point may support a finite number of functions, each function having a unique function ID. In the example of FIG. 9A, the EDCA use case has a function ID of zero, while the traffic classification use cases have values of two and three, respectively.

As noted above, a wireless specification (e.g., 802.11) may standardize some of the machine learning information. For example, each use case may have a unique descriptor, which may be standardized in the specification (e.g., traffic prediction=0001, rate adaptation=0010, etc.). The descriptor may be shared by the access point with non-access point stations during discovery.

In some aspects, partial information of the machine learning model may be shared by the access point during discovery. Complete information may be shared during or after setup. A complete description of the machine learning model includes (i) model name (e.g., type), (ii) model structure, and (iii) model parameters. Options for standardizing these components are now discussed.

In some aspects, the specifications may define a set of machine learning models for each use case. For example, for a particular use case, the specifications may define a random forest model with a fixed structure. In these aspects, the model parameters may be exchanged over an air interface, such as an 802.11 air interface.

In other aspects, the specifications may define encoding for individual components of a machine learning algorithm. In other words, different components of the machine learning model may be standardized. For example, the standards may define an encoding for the name/type of the machine learning model, structure of the machine learning model, and parameters of the machine learning model. The model type may be a candidate set of machine learning models (e.g., random forest (RF), deep neural network (DNN), convolutional neural network (CNN), recurrent neural network (RNN)). Each type may be assigned an identifier (e.g., RF=0001, DNN=0010, etc.). The specifications may also define the model structure, including the machine learning algorithm and the model parameters. Each of these components may be exchanged over an air interface, e.g., the 802.11 air interface. The parameters may be carried in elements and frames. Example of parameters are weights for a trained neural network.

In other aspects of the present disclosure, external standardized interfaces define machine learning algorithm components, including the machine learning model, structure, and parameters. For example, the Predictive Model Markup Language (PMML) or Open Neural Network Exchange (ONNX) may be used to define the components. In these aspects, the exchange of model type, structure, and parameters may occur via an air interface (e.g., 802.11), or the access point may provide a universal resource locator (URL) of an external server to enable the station to download the information.

According to aspects of the present disclosure, the specifications may standardize input. In some aspects, a standard set of input features may be defined, such as maximum loss rate, average RSSI, etc. These aspects may be suitable when machine learning models (including the structure) are also standardized, as described above.

In other aspects, the specifications may define a set of measurements (e.g., RSSI, throughput, loss rate) and a set of operations (e.g., maximum, average, last known value, etc.). In these aspects, an input feature to the machine learning model may be represented as one or more operations over a measurement (e.g., average RSSI, maximum loss rate, last known MCS). These aspects may be suitable when encoding for machine learning models and structures is used (either in 802.11 or external standards) as described above.

In still other aspects, the specifications may define a combination of a standard set of input features and a standard set of measurements. In these aspects, the specifications may define a standard set of inputs and additional inputs may be chosen by the access point using, for example, when the standards define a set of measurements and operations, as described above. Information pertaining to the input of the machine learning models may be shared after setup.

The specifications may define a candidate set of outputs for a use case. In some aspects, an access point may only support a subset of these outputs. For example, for EDCA optimization, the standards may define CW_min, CW_max, arbitration interframe spacing (AIFS), a transmission opportunity limit (TXOPLimit) for access classes video, voice, background traffic, and best effort traffic (AC_VI, AC_VO, AC_BK, AC_BE) as sixteen potential outputs. In the example of FIG. 9A, the access point that supports the EDCA optimization only provides CW_min and CW_max for AC_VI and AC_VO as outputs. In other aspects, the specification may define a set of output variables and a set of operations over the output variables (similar to as described above with respect to the inputs). Information pertaining to the output of the machine learning models may be shared after setup.

Figure 9B:
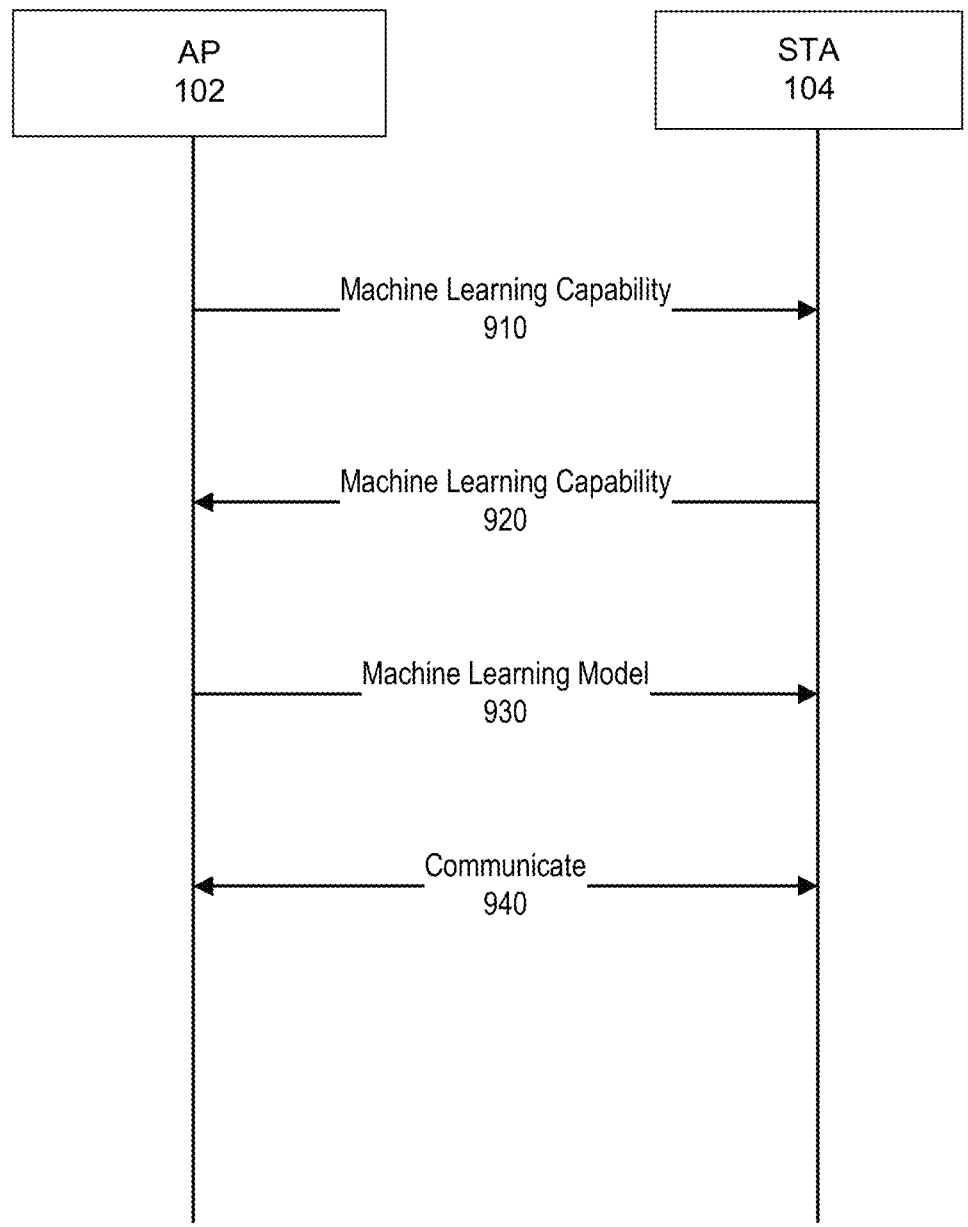
FIG. 9B is a call flow diagram illustrating a machine learning framework for wireless local area networks (WLANs), in accordance with aspects of the present disclosure.

FIG. 9B is a call flow diagram illustrating a machine learning framework for wireless local area networks (WLANs), in accordance with aspects of the present disclosure. Capability exchange between an access point and a non-access point station will now be described in more detail. According to aspects of the present disclosure, an access point may advertise use cases supported for machine learning (e.g., EDCA optimization, interference estimation, traffic classification). For example, as seen in FIG. 9B, at 910 an access point 102 transmits a message indicating its machine learning capabilities. Each access point may advertise multiple machine learning models for the same use case (e.g., random forests and DNN for traffic classification, as seen in FIG. 9A). For each machine learning function (which may be identified by a function ID), the access point announces a level of machine learning support. For example, the access point may announce support of proprietary models by non-access point STAs. That is, non-access point stations may use proprietary models to optimize WLAN features that are otherwise specified in the standards. The access point may also offer downloadable trained models. Referring back to FIG. 9A, these levels of support may include a downloaded model that cannot be re-trained by the non-access point, as seen with respect to EDCA optimization. This level of support may be selected when fairness with legacy stations that do not use machine learning is a consideration. Other levels of support are seen with respect to traffic classification. In a first level, the downloaded model can be re-trained by the non-access point but no upload of the updated model and aggregation is supported (e.g., no federated learning). In a second level, a downloaded model can be re-trained by the non-access point and the updated model can be uploaded to the access point (e.g., federated learning). This level is seen in the last row of the traffic classification use case (with DNN).

For a multi-link device (MLD) access point, supported use cases, machine learning models, or parameters may be different on different links. The access point announcements may be transmitted by the access point pre-association, during association, or post-association.

A non-access point station may also transmit announcements. For example, as seen in FIG. 9B, a non-access point station 104 may transmit a message indicating a machine learning capability of the station 104 at 920. The non-access point station may indicate use cases of interest, for example, using a traffic classification model. The non-access point station may announce support of certain machine learning models, measurements, and operations. In one example, the non-access point station may support random forest models, but not DNN. As another example, the non-access point station may support basic operations, but not support fast Fourier transform (FFT).

Examples of operations include basic operations, statistical operations, and signal processing operations. Basic operations may include, for example: sampling, such as sampling with a specified observation window and sampling interval; logarithm, such as logarithm with a specified base; a last known value; and/or a count attribute, such as a count attribute with a specified observation window. Statistical operations may include, for example: averaging, such as averaging with a specified observation window; and/or a quantile operation, such as a quantile operation with a specified observation window and quantile. An example of a signal processing operation includes a fast Fourier transform (FFT), such as an FFT with a specified size.

The non-access point station may indicate computational capabilities (e.g., hardware acceleration, and million instructions per second (MIPS) constraints), and location with respect to the access point. The non-access point station may also indicate mobility information, such as a mobility level (e.g., walking or stationary), as well as an environment of the station (e.g., residential, outdoor, or stadium.)

The non-access point station may select from the same four levels of support as the access point. For example, for one of the levels, the non-access point station may indicate the non-access point supports using a downloaded model but does not support re-training the downloaded model. For an MLD non-access point, supported use cases and machine learning models may be different on different links. These announcements by the non-access point may be transmitted during or post-association.

Referring again to FIG. 9B, at 930, the access point may communicate information associated with a machine learning model for use between the access point 102 and the station 104, based on the exchanged capability messages. In some aspects, partial information of the machine learning model may be shared by the access point during discovery. Complete information may be shared during or after setup. A complete description of the machine learning model includes (i) model name (e.g., type), (ii) model structure, and (iii) model parameters. In aspects of the present disclosure, the exchange of model type, structure, and parameters may occur via an air interface (e.g., 802.11), or the access point may provide a universal resource locator (URL) of an external server to enable the station to download the information.

At 940, the access point 102 and station 104 may communicate based on the machine learning model. For example, the machine learning model may be used for enhanced distributed channel access (EDCA) optimization, interference estimation, rate adaptation, channel state information (CSI) enhancement, and traffic classification. The machine learning model's use can be enabled through the access point's BSS, including by stations 104 that might not otherwise possess the ability to train complex models. The machine learning techniques can be used to (jointly) optimize one or more 802.11 features, which may be difficult to optimize using conventional (e.g., non-machine learning) techniques. For example, rate adaptation is a complex problem that involves the interplay of several 802.11 parameters (bandwidth, number of spatial streams, MCS, etc.) and machine learning can be used to jointly optimize these parameters.

According to aspects of the present disclosure, inputs to the machine learning model may be described as building blocks including a set of measurements or observations and a set of operations. Examples of measurements include radio statistics, such as received signal strength indication (RSSI), number of spatial streams, modulation and coding scheme (MCS), channel number, number of re-transmissions, hand-off/association failures (with cause codes if available), a successful number of triggered transmissions (e.g., number of trigger based PPDUs) versus total packets transmitted (number of single user (SU) PPDU), number of requests to send/clear to send (RTS/CTS) exchanges, neighboring access point's RSSI, multi-user (MU) order, number of MU multiple input multiple output (MIMO) PPDUs and packet error rate (PER), number of MU orthogonal frequency division multiplexing access (OFDMA) PPDUs and PER, as well as power control parameters (e.g., allowed transmit power).

Other measurements relate to medium statistics, such as congestion statistics (e.g., busy status, number of collisions), number of neighboring access points, (SU/MU) EDCA values, whether spatial reuse (SR) is enabled, as well as overlapping basic service set/preamble detection (OBSS-PD) threshold values.

Still, other measurements relate to applications and usage statistics, such as delay statistics, packet-size distribution, user activity per-hour (for power saving), speed of the user (if available), residential or enterprise environment (if known), and requested quality of service (QoS) values/admission control (AC)/delay.

Some measurements may relate to device version, capabilities, and state. Examples include which amendment (e.g., specification name), Wi-Fi capabilities, remaining battery state-of-charge, and authentication-type.

Using these building blocks, any arbitrary input feature may be described. On any given measurement, zero or more operations may be performed. In a first example, where the feature for the machine learning model is downlink aggregate packet size, the measurement may be of a downlink packet size, and the operation may be a sum operation with a specified observation window. In a second example, where the feature for the machine learning model is maximum packet size, the measurement may be of a downlink packet size, and the operation may be a quantile operation with a specified observation window and quantile (e.g., 100.) In a third example, where the feature for the machine learning model is a 512 point FFT, the measurement may be of a downlink packet size. In this third example, three operations may be: to sample with a specified observation window and sampling interval, to sum with a specified observation window, and to perform a FFT with a specified size.

By enabling machine learning, access point (AP) and station (STA) communications may be improved. In some examples, the described techniques, such as communicating between an access point and a non-access point station based on a machine learning model, can be used to (jointly) optimize one or more 802.11 features. These features may be difficult to optimize using conventional (e.g., non-machine learning) techniques. Moreover, downloadable models may help in creating fairness amongst the users of the machine learning models.

Figure 10:
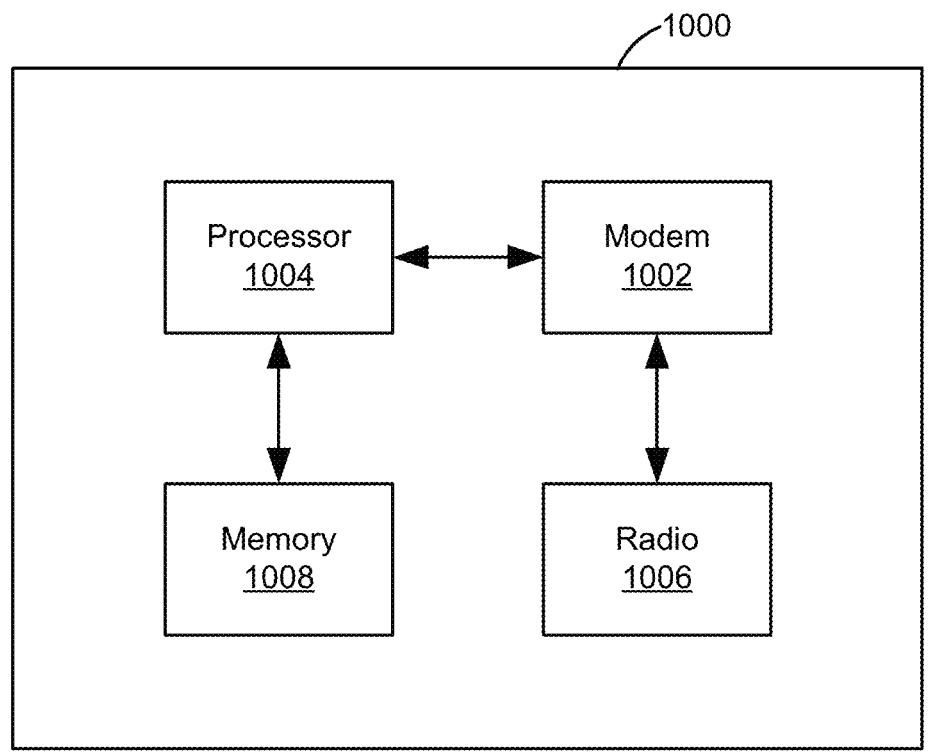
FIG. 10 shows a block diagram of an example wireless communication device, in accordance with aspects of the present disclosure.

FIG. 10 shows a block diagram of an example wireless communication device 1000, in accordance with aspects of the present disclosure. In some implementations, the wireless communication device 1000 can be an example of a device for use in a STA such as one of the STAs 104 described above with reference to FIG. 1. In some implementations, the wireless communication device 1000 can be an example of a device for use in an AP such as the AP 102 described above with reference to FIG. 1. The wireless communication device 1000 is capable of transmitting and receiving wireless communications in the form of, for example, wireless packets. For example, the wireless communication device 1000 can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba, and 802.11be.

The wireless communication device 1000 can be, or can include, a chip, system on chip (SoC), chipset, package or device that includes one or more modems 1002, for example, a Wi-Fi (IEEE 802.11 compliant) modem. In some implementations, the one or more modems 1002 (collectively "the modem 1002") additionally include a wireless wide area network (WWAN) modem (for example, a 3GPP 4G LTE or 5G compliant modem). In some implementations, the wireless communication device 1000 also includes one or more processors, processing blocks or processing elements 1004 (collectively "the processor 1004") coupled with the modem 1002. In some implementations, the wireless communication device 1000 additionally includes one or more radios 1006 (collectively "the radio 1006") coupled with the modem 1002. In some implementations, the wireless communication device 1000 further includes one or more memory blocks or elements 1008 (collectively "the memory 1008") coupled with the processor 1004 or the modem 1002.

The modem 1002 can include an intelligent hardware block or device such as, for example, an application-specific integrated circuit (ASIC), among other examples. The modem 1002 is generally configured to implement a PHY layer, and in some implementations, also a portion of a MAC layer (for example, a hardware portion of the MAC layer). For example, the modem 1002 is configured to modulate packets and to output the modulated packets to the radio 1006 for transmission over the wireless medium. The modem 1002 is similarly configured to obtain modulated packets received by the radio 1006 and to demodulate the packets to provide demodulated packets. In addition to a modulator and a demodulator, the modem 1002 may further include digital signal processing (DSP) circuitry, automatic gain control (AGC) circuitry, a coder, a decoder, a multiplexer, and a demultiplexer. For example, while in a transmission mode, data obtained from the processor 1004 may be provided to an encoder, which encodes the data to provide coded bits. The coded bits may then be mapped to a number network slice subnet (NSS) of spatial streams for spatial multiplexing or a number of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 1006. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 1006, for example, by detecting the presence of the signal and estimating the initial timing and frequency offsets. The DSP circuitry is further configured to digitally condition the signal, for example, using channel (narrowband) filtering and analog impairment conditioning (such as correcting for in-phase/quadrature (I/Q) imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (e.g., the processor 1004) for processing, evaluation, or interpretation.

The radio 1006 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 1000 can include, or be coupled with, multiple transmit antennas (each with a corresponding transmit chain) and multiple receive antennas (each with a corresponding receive chain). The symbols output from the modem 1002 are provided to the radio 1006, which then transmits the symbols via the coupled antennas. Similarly, symbols received via the antennas are obtained by the radio 1006, which then provides the symbols to the modem 1002.

The processor 1004 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1004 processes information received through the radio 1006 and the modem 1002, and processes information to be output through the modem 1002 and the radio 1006 for transmission through the wireless medium. For example, the processor 1004 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 1004 may generally control the modem 1002 to cause the modem 1002 to perform various operations described above.

The memory 1008 can include tangible storage media such as random-access memory (RAM) or read-only memory (ROM), or combinations thereof. The memory 1008 also can store non-transitory processor- or computer-executable software (SW) code containing instructions that, when executed by the processor 1004, cause the processor to perform various operations described herein for wireless communication, including the generation, transmission, reception, and interpretation of MPDUs, frames or packets. For example, various functions of components disclosed herein, or various blocks or steps of a method, operation, process or algorithm disclosed herein, can be implemented as one or more modules of one or more computer programs.

Figure 11B:
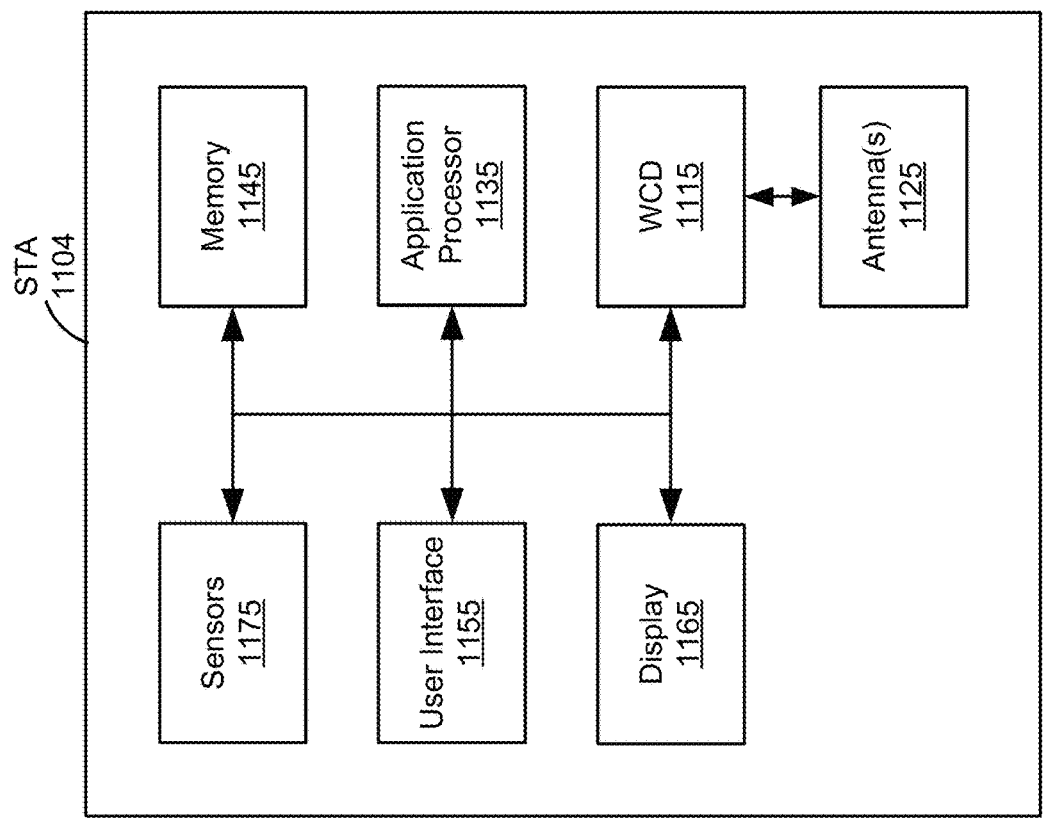
FIG. 11B shows a block diagram of an example station (STA), in accordance with aspects of the present disclosure.
Figure 11A:
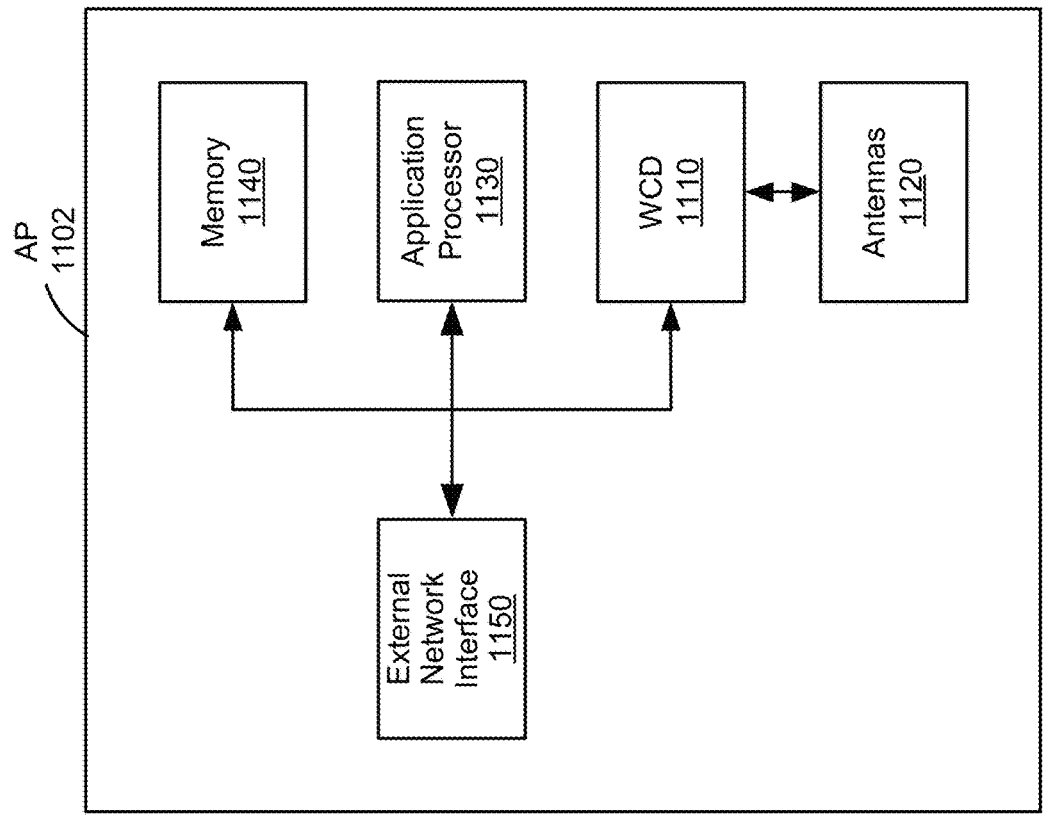
FIG. 11A shows a block diagram of an example access point (AP), in accordance with aspects of the present disclosure.

FIG. 11A shows a block diagram of an example AP 1102, in accordance with aspects of the present disclosure. For example, the AP 1102 can be an example implementation of the AP 102 described with reference to FIG. 1. The AP 1102 includes a wireless communication device (WCD) 1110 (although the AP 1102 may itself also be referred to generally as a wireless communication device as used herein). For example, the wireless communication device 1110 may be an example implementation of the wireless communication device 1000 described with reference to FIG. 10. The AP 1102 also includes multiple antennas 1120 coupled with the wireless communication device 1110 to transmit and receive wireless communications. In some implementations, the AP 1102 additionally includes an application processor 1130 coupled with the wireless communication device 1110, and a memory 1140 coupled with the application processor 1130. The AP 1102 further includes at least one external network interface 1150 that enables the AP 1102 to communicate with a core network or backhaul network to gain access to external networks including the Internet. For example, the external network interface 1150 may include one or both of a wired (for example, Ethernet) network interface and a wireless network interface (such as a WWAN interface). Ones of the aforementioned components can communicate with other ones of the components directly or indirectly, over at least one bus. The AP 1102 further includes a housing that encompasses the wireless communication device 1110, the application processor 1130, the memory 1140, and at least portions of the antennas 1120, and external network interface 1150.

FIG. 11B shows a block diagram of an example STA 1104, in accordance with aspects of the present disclosure. For example, the STA 1104 can be an example implementation of the STA 104 described with reference to FIG. 1. The STA 1104 includes a wireless communication device 1115 (although the STA 1104 may itself also be referred to generally as a wireless communication device as used herein). For example, the wireless communication device 1115 may be an example implementation of the wireless communication device 1000 described with reference to FIG. 10. The STA 1104 also includes one or more antennas 1125 coupled with the wireless communication device 1115 to transmit and receive wireless communications. The STA 1104 additionally includes an application processor 1135 coupled with the wireless communication device 1115, and a memory 1145 coupled with the application processor 1135. In some implementations, the STA 1104 further includes a user interface (UI) 1155 (such as a touchscreen or keypad) and a display 1165, which may be integrated with the UI 1155 to form a touchscreen display. In some implementations, the STA 1104 may further include one or more sensors 1175 such as, for example, one or more inertial sensors, accelerometers, temperature sensors, pressure sensors, or altitude sensors. Ones of the aforementioned components can communicate with other ones of the components directly or indirectly, over at least one bus. The STA 1104 further includes a housing that encompasses the wireless communication device 1115, the application processor 1135, the memory 1145, and at least portions of the antennas 1125, UI 1155, and display 1165.

The access point 102 and stations 104 may each include a machine learning (ML) module in the CPU 402, GPU 404, DSP 406, NPU 408, memory 418, processor 1004, memory 1008, memory 1140, application processor 1130, memory 1145, and/or application processor 1135 of FIGS. 4, 10, 11A, and 11B. The machine learning module may transmit a first message indicating a first machine learning capability of the first wireless device, and may receive, from a second wireless device, a second message indicating a second machine learning capability of the second wireless device. The machine learning module may also communicate information associated with a machine learning model for use between the first wireless device and the second wireless device based at least in part on the second machine learning capability and the first machine learning capability. The machine learning module may also communicate with the second wireless device based at least in part on the machine learning model.

Figure 12:
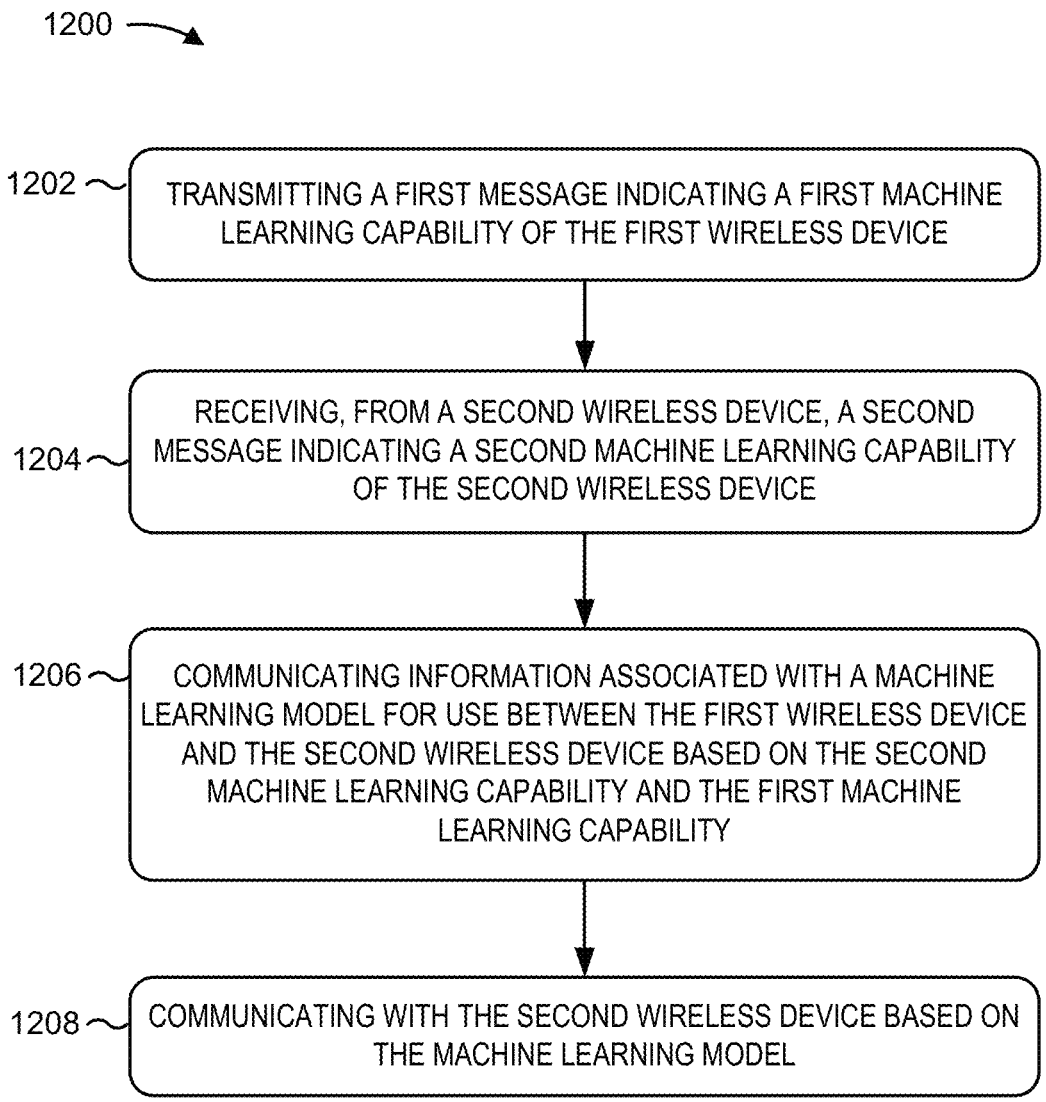
FIG. 12 is a flow diagram illustrating an example process performed, for example, by a wireless device, in accordance with various aspects of the present disclosure.

FIG. 12 is a flow diagram illustrating an example process 1200 performed, for example, by a wireless device, in accordance with various aspects of the present disclosure. The example process 1200 is an example of a machine learning framework for wireless local area networks (WLANs).

As shown in FIG. 12, in some aspects, the process 1200 may include transmitting a first message indicating a first machine learning capability of the first wireless device (block 1202). For example, the first machine learning capability may indicate a first use case and at least one corresponding machine learning model. The first machine learning capability may also indicate support for proprietary models. In some aspects, the first wireless device may advertise a level of machine learning support indicating at least one of: the machine learning model cannot be retrained by the second wireless device, the machine learning model can be retrained by the second wireless device and upload of updated model parameters is not supported, or the machine learning model can be retrained by the second wireless device and upload of updated model parameters is supported.

In some aspects, the process 1200 may include receiving, from a second wireless device, a second message indicating a second machine learning capability of the second wireless device (block 1204). For example, the second machine learning capability may indicate a second use case and at least one supported second machine learning model. The second machine learning capability may also indicate a location of the second wireless device relative to the first wireless device, a mobility level of the second device, and computational capabilities of the second wireless device.

In some aspects, the process 1200 may include communicating information associated with a machine learning model for use between the first wireless device and the second wireless device based on the second machine learning capability and the first machine learning capability (block 1206). For example, the first wireless device may communicate the information by transmitting a function identifier (ID) that identifies a machine learning function. The function ID may indicate a selected use case, the machine learning model, a set of inputs, and an output. In some aspects, communicating the information may include transmitting a link to an external server for downloading the machine learning model. In other aspects, communicating of the information may include transmitting initial information for a supported machine learning function during discovery and transmitting additional information for the supported machine learning function during or after setup.

In some aspects, the process 1200 may include communicating with the second wireless device based at least in part on the machine learning model (block 1208). For example, the machine learning model may be a model of a set of standardized models for a selected use case or a set of standardized components. In some aspects, parameters and a structure of the machine learning model are defined by an external interface. A set of inputs to the machine learning model may be a standardized set of input features and/or input features defined by the first wireless device and including a standardized set of measurements and a standardized set of operations applied to the measurements. A set of outputs from the machine learning model may be a subset of standardized candidate outputs and/or a standardized set of outputs.

Figure 13:
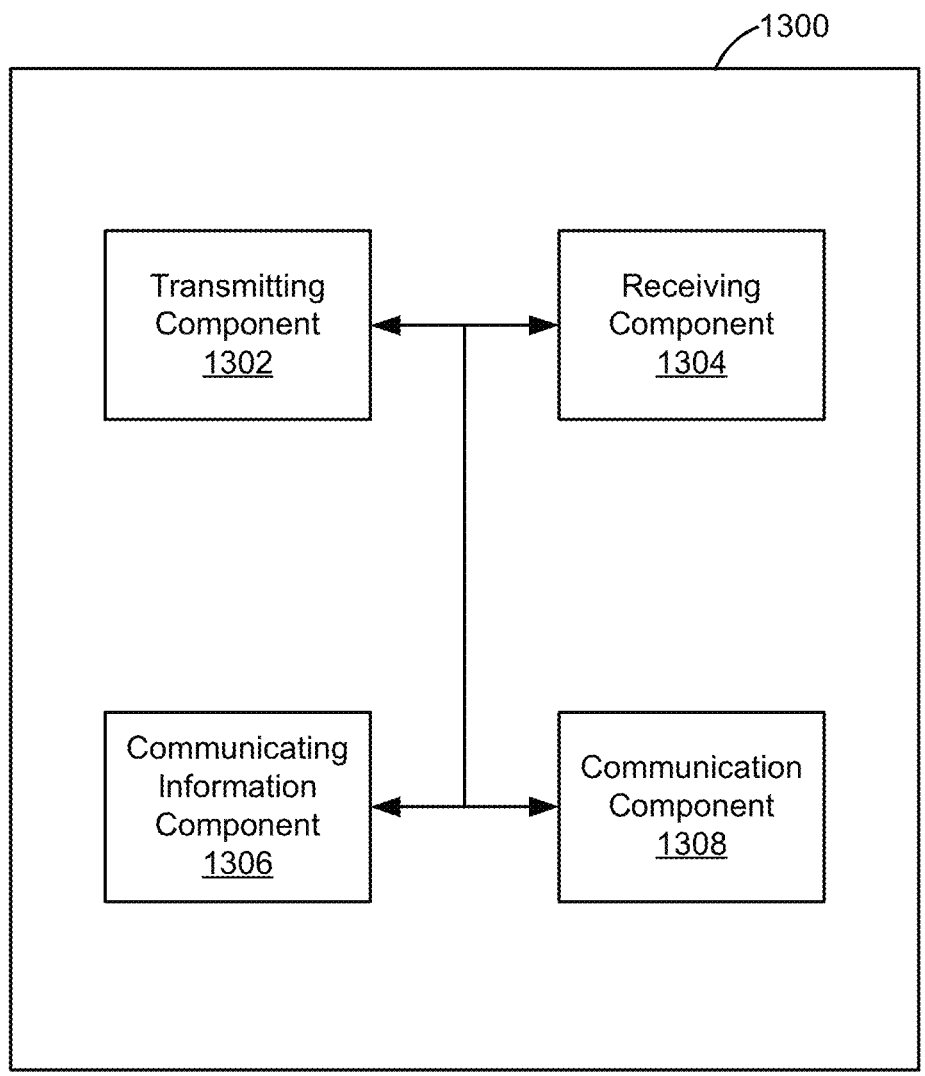
FIG. 13 shows a block diagram of an example access point (AP) that supports a machine learning framework for a wireless local area network (WLAN), according to some implementations.

FIG. 13 shows a block diagram of an example wireless communication device 1300 that supports a machine learning framework for WLAN according to some implementations. In some implementations, the wireless communication device 1300 is configured to perform one or more of the processes 1200 described above with reference to FIG. 12. The wireless communication device 1300 may be an example implementation of the wireless communication device 1000 described above with reference to FIG. 10. For example, the wireless communication device 1300 can be a chip, SoC, chipset, package or device that includes at least one modem (for example, a Wi-Fi (IEEE 802.11) modem or a cellular modem such as the modem 1002), at least one processor (such as the processor 1004), at least one radio (such as the radio 1006) and at least one memory (such as the memory 1008). In some implementations, the wireless communication device 1300 can be a device for use in an AP, such as one of the APs 102 and 1102 described above with reference to FIGS. 1 and 11A, respectively. In some other implementations, the wireless communication device 1300 can be an AP that includes such a chip, SoC, chipset, package, or device as well as at least one antenna (such as the antennas 1120).

The wireless communication device 1300 includes a transmitting component 1302, a receiving component 1304, a communicating information component 1306, and a communication component 1308. Portions of one or more of the components 1302, 1304, 1306, and 1308 may be implemented at least in part in hardware or firmware. For example, the receiving component 1304 may be implemented at least in part by a modem (such as the modem 1002). In some implementations, at least some of the components 1302, 1304, 1306, and 1308 are implemented at least in part as software stored in a memory (such as the memory 1008). For example, portions of one or more of the components 1302, 1304, 1306, or 1308 can be implemented as non-transitory instructions (or "code") executable by a processor (such as the processor 1004) to perform the functions or operations of the respective module.

The transmitting component 1302 is configured to transmit a first message indicating a first machine learning capability of the first wireless device.

The receiving component 1304 is configured to receive, from a second wireless device, a second message indicating a second machine learning capability of the second wireless device.

The communicating information component 1306 is configured to communicate information associated with a machine learning model for use between the first wireless device and the second wireless device based at least in part on the second machine learning capability and the first machine learning capability.

The communication component 1308 is configured to communicate with the second wireless device based at least in part on the machine learning model.

Figure 14:
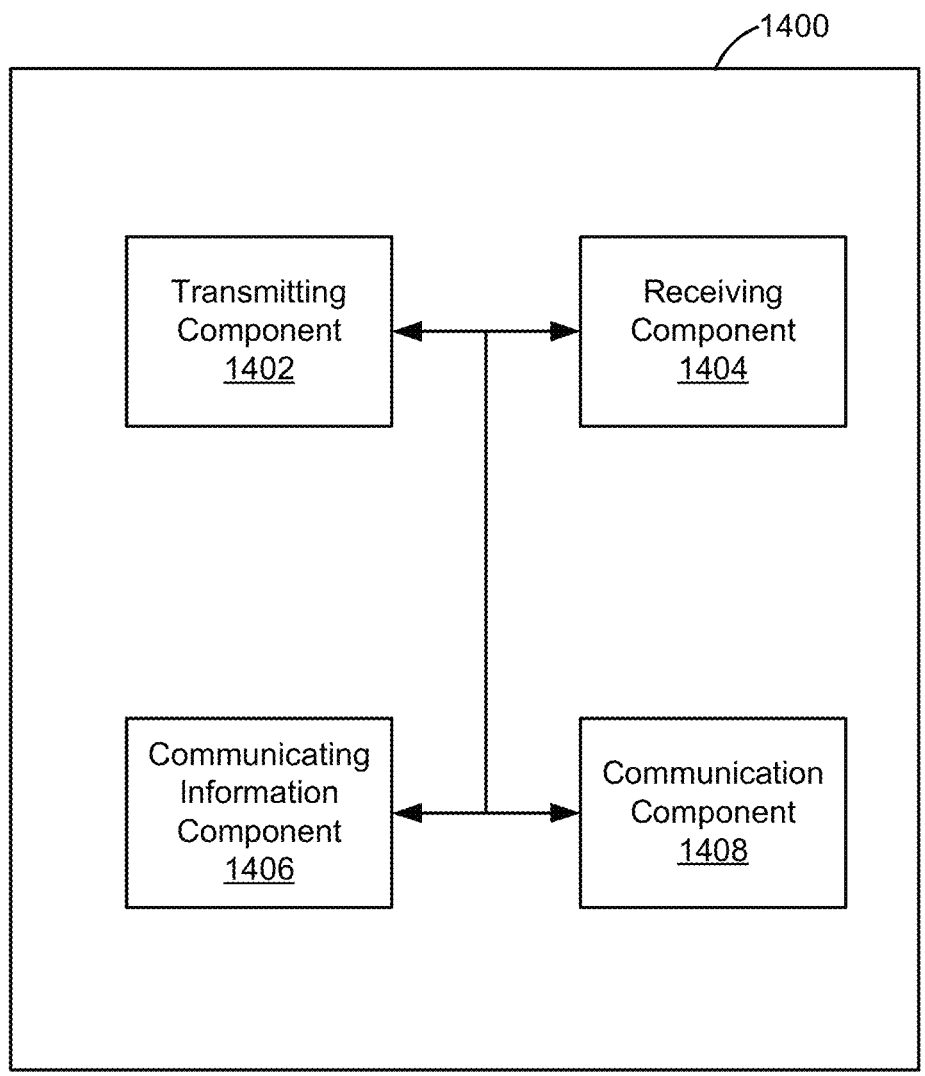
FIG. 14 shows a block diagram of an example station (STA) that supports a machine learning framework for a WLAN, according to some implementations.

FIG. 14 shows a block diagram of an example wireless communication device 1400 that supports a machine learning framework for a WLAN, according to some implementations. In some implementations, the wireless communication device 1400 is configured to perform one or more of the processes 1200 described above with reference to FIG. 12. The wireless communication device 1400 may be an example implementation of the wireless communication device 1000 described above with reference to FIG. 10. For example, the wireless communication device 1400 can be a chip, SoC, chipset, package or device that includes at least one modem (for example, a Wi-Fi (IEEE 802.11) modem or a cellular modem such as the modem 1002), at least one processor (such as the processor 1004), at least one radio (such as the radio 1006) and at least one memory (such as the memory 1008). In some implementations, the wireless communication device 1400 can be a device for use in a STA, such as one of the STAs 104 and 1104 described above with reference to FIGS. 1 and 11B, respectively. In some other implementations, the wireless communication device 1400 can be a station (STA) that includes such a chip, SoC, chipset, package or device as well as at least one antenna (such as the antennas 1125).

The wireless communication device 1400 includes a transmitting component 1402, a receiving component 1404, a communicating information component 1406, and a communication component 1408. Portions of one or more of the components 1402, 1404, 1406, and 1408 may be implemented at least in part in hardware or firmware. For example, the receiving component 1404 may be implemented at least in part by a modem (such as the modem 1002). In some implementations, at least some of the components 1402, 1404, 1406, and 1408, are implemented at least in part as software stored in a memory (such as the memory 1008). For example, portions of one or more of the components 1402, 1404, 1406, or 1408 can be implemented as non-transitory instructions (or "code") executable by a processor (such as the processor 1004) to perform the functions or operations of the respective module.

The transmitting component 1402 is configured to transmit a first message indicating a first machine learning capability of the first wireless device.

The receiving component 1404 is configured to receive, from a second wireless device, a second message indicating a second machine learning capability of the second wireless device.

The communicating information component 1406 is configured to communicate information associated with a machine learning model for use between the first wireless device and the second wireless device based at least in part on the second machine learning capability and the first machine learning capability.

The communication component 1408 is configured to communicate with the second wireless device based at least in part on the machine learning model.

EXAMPLE ASPECTS

Aspect 1: An apparatus for wireless communication, comprising: a memory; and at least one processor coupled to the memory, the at least one processor configured: to transmit a first message indicating a first machine learning capability of the first wireless device; to receive, from a second wireless device, a second message indicating a second machine learning capability of the second wireless device; to communicate information associated with a machine learning model for use between the first wireless device and the second wireless device based at least in part on the second machine learning capability and the first machine learning capability; and to communicate with the second wireless device based at least in part on the machine learning model.

Aspect 2: The apparatus of Aspect 1, in which the first machine learning capability indicates a first use case and at least one corresponding machine learning model, and the second machine learning capability indicates a second use case, and at least one supported second machine learning model.

Aspect 3: The apparatus of Aspect 1 or 2, in which the second machine learning capability indicates a location of the second wireless device relative to the first wireless device, a mobility level of the second device, and computational capabilities of the second wireless device.

Aspect 4: The apparatus of any of the preceding Aspects, in which the at least one processor, configured to communicate the information, is configured to communicate information by transmitting a function identifier (ID) that identifies a machine learning function; and the function ID comprises a selected use case, a selected machine learning model, a set of inputs, and an output.

Aspect 5: The apparatus of any of the preceding Aspects, in which the machine learning model comprises a model of a set of standardized models for a selected use case.

Aspect 6: The apparatus of any of the preceding aspects, in which the machine learning model comprises a set of standardized components.

Aspect 7: The apparatus of any of the preceding Aspects, in which parameters and a structure of the machine learning model are defined by an external interface.

Aspect 8: The apparatus of any of the preceding Aspects, in which the at least one processor, configured to communicate the information, is configured to communicate information by transmitting a link to an external server for downloading the machine learning model.

Aspect 9: The apparatus of any of the preceding aspects, in which the at least one processor, configured to communicate the information, is configured to communicate information by transmitting initial information for a supported machine learning function during discovery and transmitting additional information for the supported machine learning function during or after setup.

Aspect 10: The apparatus of any of the preceding Aspects, in which a set of inputs to the machine learning model comprises a standardized set of input features.

Aspect 11: The apparatus of any of the preceding aspects, in which a set of inputs to the machine learning model comprises input features defined by the first wireless device and includes a standardized set of measurements and a standardized set of operations applied to the measurements.

Aspect 12: The apparatus of any of the preceding Aspects, in which a set of outputs from the machine learning model comprises a selected subset of standardized candidate outputs.

Aspect 13: The apparatus of any of the preceding aspects, in which a set of outputs from the machine learning model comprises a standardized set of outputs.

Aspect 14: The apparatus of any of the preceding Aspects, in which the first machine learning capability indicates support for proprietary models.

Aspect 15: The apparatus of any of the preceding Aspects, in which the at least one processor is further configured to advertise a level of machine learning support indicating at least one of: the learning model cannot be retrained by the second wireless device, the selected machine learning model can be retrained by the second wireless device and upload of updated model parameters is not supported, or the selected machine learning model can be retrained by the second wireless device and upload of updated model parameters is supported.

Aspect 16: A method of wireless communication at a first wireless device, comprising: transmitting a first message indicating a first machine learning capability of the first wireless device; receiving, from a second wireless device, a second message indicating a second machine learning capability of the second wireless device; communicating information associated with a machine learning model for use between the first wireless device and the second wireless device based at least in part on the second machine learning capability and the first machine learning capability; and communicating with the second wireless device based at least in part on the machine learning model.

Aspect 17: The method of Aspect 16, wherein the first machine learning capability indicates a first use case and at least one corresponding machine learning model, and the second machine learning capability indicates a second use case, and at least one supported second machine learning model.

Aspect 18: The method of Aspect 16 or 17, wherein the second machine learning capability indicates a location of the second wireless device relative to the first wireless device, a mobility level of the second device, and computational capabilities of the second wireless device.

Aspect 19: The method of any of the Aspects 16-18, wherein: the communicating information comprises transmitting a function identifier (ID) that identifies a machine learning function; and the function ID comprises a selected use case, a selected machine learning model, a set of inputs, and an output.

Aspect 20: The method of any of the Aspects 16-19, wherein the machine learning model comprises a model of a set of standardized models for a selected use case.

Aspect 21: The method of any of the Aspects 16-20, wherein the machine learning model comprises a set of standardized components.

Aspect 22: The method of any of the Aspects 16-21, wherein parameters and a structure of the machine learning model are defined by an external interface.

Aspect 23: The method of any of the Aspects 16-22, wherein the communicating information comprises transmitting a link to an external server for downloading the machine learning model.

Aspect 24: The method of any of the Aspects 16-23, wherein the communicating information comprises transmitting initial information for a supported machine learning function during discovery and transmitting additional information for the supported machine learning function during or after setup.

Aspect 25: The method of any of the Aspects 16-24, wherein a set of inputs to the machine learning model comprises a standardized set of input features.

Aspect 26: The method of any of the Aspects 16-25, wherein a set of inputs to the machine learning model comprises input features defined by the first wireless device and includes a standardized set of measurements and a standardized set of operations applied to the measurements.

Aspect 27: The method of any of the Aspects 16-26, wherein a set of outputs from the machine learning model comprises a selected subset of standardized candidate outputs.

Aspect 28: The method of any of the Aspects 16-27, wherein a set of outputs from the machine learning model comprises a standardized set of outputs.

Aspect 29: An apparatus for wireless communication by a first wireless device, comprising: means for transmitting a first message indicating a first machine learning capability of the first wireless device; means for receiving, from a second wireless device, a second message indicating a second machine learning capability of the second wireless device; means for communicating information associated with a machine learning model for use between the first wireless device and the second wireless device based at least in part on the second machine learning capability and the first machine learning capability; and means for communicating with the second wireless device based at least in part on the machine learning model.

Aspect 30: A non-transitory computer readable medium storing program code for execution by a first wireless device, the program code comprising: program code to transmit a first message indicating a first machine learning capability of the first wireless device; program code to receive, from a second wireless device, a second message indicating a second machine learning capability of the second wireless device; program code to communicate information associated with a machine learning model for use between the first wireless device and the second wireless device based at least in part on the second machine learning capability and the first machine learning capability; and program code to communicate with the second wireless device based at least in part on the machine learning model.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication by a first wireless device, comprising:
   a memory; and
   at least one processor coupled to the memory, the at least one processor configured to:
      transmit a first message indicating a first machine learning capability of the first wireless device, the first machine learning capability indicating a first use case and at least one corresponding first machine learning model;
      receive, from a second wireless device, a second message indicating a second machine learning capability of the second wireless device, the second machine learning capability indicating a second use case and at least one supported second machine learning model;
      communicate information associated with a selected machine learning model for use between the first wireless device and the second wireless device based at least in part on the second machine learning capability and the first machine learning capability; and
      communicate with the second wireless device based at least in part on the selected machine learning model.

2. The apparatus of claim 1, wherein the second machine learning capability indicates a location of the second wireless device relative to the first wireless device, a mobility level of the second device, and computational capabilities of the second wireless device.

3. The apparatus of claim 1, wherein the at least one processor, configured to communicate the information, is configured to communicate the information by transmitting a function identifier (ID) that identifies a machine learning function; and
   the function ID comprises a selected use case, the selected machine learning model, a set of inputs, and an output.

4. The apparatus of claim 1, wherein the selected machine learning model comprises a model of a set of standardized models for a selected use case.

5. The apparatus of claim 1, wherein the selected machine learning model comprises a set of standardized components.

6. The apparatus of claim 1, wherein parameters and a structure of the selected machine learning model are defined by an external interface.

7. The apparatus of claim 1, wherein the at least one processor, configured to communicate the information, is configured to communicate the information by transmitting a link to an external server for downloading the selected machine learning model.

8. The apparatus of claim 1, wherein the at least one processor, configured to communicate the information, is configured to communicate the information by transmitting initial information for a supported machine learning function during discovery and transmitting additional information for the supported machine learning function during or after setup.

9. The apparatus of claim 1, wherein a set of inputs to the selected machine learning model comprises a standardized set of input features.

10. The apparatus of claim 1, wherein a set of inputs to the selected machine learning model comprises input features defined by the first wireless device and includes a standardized set of measurements and a standardized set of operations applied to the measurements.

11. The apparatus of claim 1, wherein a set of outputs from the selected machine learning model comprises a subset of standardized candidate outputs.

12. The apparatus of claim 1, wherein a set of outputs from the selected machine learning model comprises a standardized set of outputs.

13. The apparatus of claim 1, wherein the first machine learning capability indicates support for proprietary models.

14. The apparatus of claim 1, wherein the at least one processor is further configured to advertise a level of machine learning support indicating at least one of: the second machine learning model cannot be retrained by the second wireless device, the second machine learning model can be retrained by the second wireless device and upload of updated model parameters is not supported, or the second machine learning model can be retrained by the second wireless device and upload of updated model parameters is supported.

15. A method of wireless communication at a first wireless device, comprising:
   transmitting a first message indicating a first machine learning capability of the first wireless device, the first machine learning capability indicating a first use case and at least one corresponding first machine learning model;
   receiving, from a second wireless device, a second message indicating a second machine learning capability of the second wireless device, the second machine learning capability indicating a second use case and at least one supported second machine learning model;
   communicating information associated with a selected machine learning model for use between the first wireless device and the second wireless device based at least in part on the second machine learning capability and the first machine learning capability; and
   communicating with the second wireless device based at least in part on the selected machine learning model.

16. The method of claim 15, wherein the second machine learning capability indicates a location of the second wireless device relative to the first wireless device, a mobility level of the second device, and computational capabilities of the second wireless device.

17. The method of claim 15, wherein:
communicating the information comprises transmitting a function identifier (ID) that identifies a machine learning function; and
the function ID comprises a selected use case, the selected machine learning model, a set of inputs, and an output.

18. The method of claim 15, wherein the selected machine learning model comprises a model of a set of standardized models for a selected use case.

19. The method of claim 15, wherein the selected machine learning model comprises a set of standardized components.

20. The method of claim 15, wherein parameters and a structure of the selected machine learning model are defined by an external interface.

21. The method of claim 15, wherein communicating the information comprises transmitting a link to an external server for downloading the selected machine learning model.

22. The method of claim 15, wherein communicating the information comprises transmitting initial information for a supported machine learning function during discovery and transmitting additional information for the supported machine learning function during or after setup.

23. The method of claim 15, wherein a set of inputs to the selected machine learning model comprises a standardized set of input features.

24. The method of claim 15, wherein a set of inputs to the selected machine learning model comprises input features defined by the first wireless device and includes a standardized set of measurements and a standardized set of operations applied to the measurements.

25. The method of claim 15, wherein a set of outputs from the selected machine learning model comprises a subset of standardized candidate outputs.

26. The method of claim 15, wherein a set of outputs from the selected machine learning model comprises a standardized set of outputs.

27. An apparatus for wireless communication by a first wireless device, comprising:
means for transmitting a first message indicating a first machine learning capability of the first wireless device, the first machine learning capability indicating a first use case and at least one corresponding first machine learning model;
means for receiving, from a second wireless device, a second message indicating a second machine learning capability of the second wireless device, the second machine learning capability indicating a second use case and at least one supported second machine learning model;
means for communicating information associated with a selected machine learning model for use between the first wireless device and the second wireless device based at least in part on the second machine learning capability and the first machine learning capability; and
means for communicating with the second wireless device based at least in part on the selected machine learning model.

28. A non-transitory computer readable medium storing program code for execution by a first wireless device, the program code comprising:
program code to transmit a first message indicating a first machine learning capability of the first wireless device, the first machine learning capability indicating a first use case and at least one corresponding first machine learning model;
program code to receive, from a second wireless device, a second message indicating a second machine learning capability of the second wireless device, the second machine learning capability indicating a second use case and at least one supported second machine learning model;
program code to communicate information associated with a selected machine learning model for use between the first wireless device and the second wireless device based at least in part on the second machine learning capability and the first machine learning capability; and
program code to communicate with the second wireless device based at least in part on the selected machine learning model.

* * * * *